US00RE38774E

(19) United States
(12) Reissued Patent
Davis

(10) Patent Number: US RE38,774 E
(45) Date of Reissued Patent: Aug. 16, 2005

(54) MEANS FOR MOVEABLE BILLS OR BRIMS OF CAPS AND HATS

(76) Inventor: Gwennette Q. Davis, 34 Green Acre La., Rochester, NY (US) 14624

(21) Appl. No.: 10/264,925

(22) Filed: Oct. 4, 2002

Related U.S. Patent Documents

Reissue of:
(64) Patent No.: 6,263,508
Issued: Jul. 24, 2001
Appl. No.: 09/583,690
Filed: May 31, 2000

U.S. Applications:
(60) Provisional application No. 60/137,551, filed on Jun. 4, 1999.

(51) Int. Cl.[7] ..... A42B 1/06

(52) U.S. Cl. ..... 2/10; 2/175.1; 2/195.1; 2/209.11

(58) Field of Search ..... 2/10, 171.1, 171, 2/171.4, 171.7, 171.8, 175.1, 175.2, 195.1, 209.11–209.13

(56) References Cited

U.S. PATENT DOCUMENTS

| | | | | |
|---|---|---|---|---|
| 1,232,992 A | | 7/1917 | Sterling | |
| 2,855,604 A | | 10/1958 | Austin | |
| 5,471,684 A | | 12/1995 | Casale | |
| 5,533,211 A | | 7/1996 | Mehrens | |
| 5,613,246 A | | 3/1997 | Alexander | |
| 5,715,534 A | | 2/1998 | Mobley | |
| 5,870,772 A | * | 2/1999 | Sprouse | 2/10 |

* cited by examiner

*Primary Examiner*—Katherine Moran
(74) *Attorney, Agent, or Firm*—Jaeckle Fieischmann & Mugel, LLP

(57) ABSTRACT

A unique fashion or sports hat or cap assemblage having a brim or bill/visor, distinctly designed with a sliding mechanism to rotate the brim or bill/visor up to 360 degrees without detachment from the crown of the cap or hat, including interchangeable and multiple options for the crown, body and visor portions and in which the sliding mechanism is attached to a headband and the headband in turn attached to an intermediate elastic material also attached to the periphery of the crown.

12 Claims, 5 Drawing Sheets

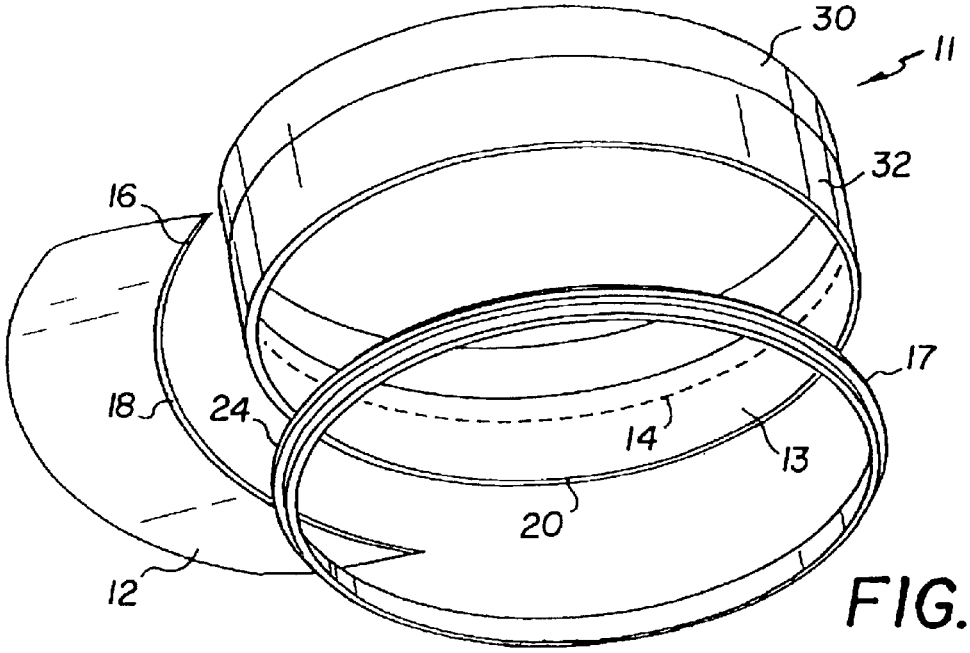
FIG. 4
FIG. 6
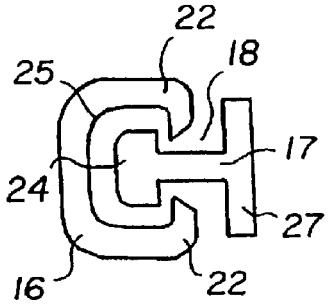
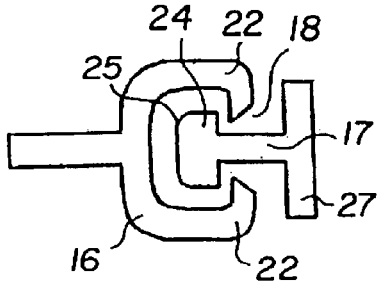
FIG. 6a
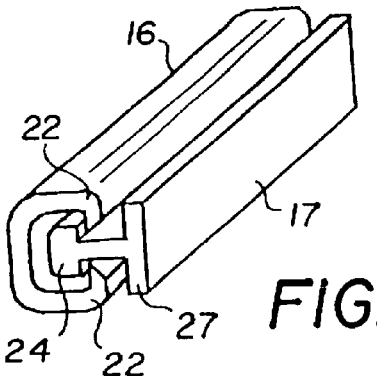
FIG. 5
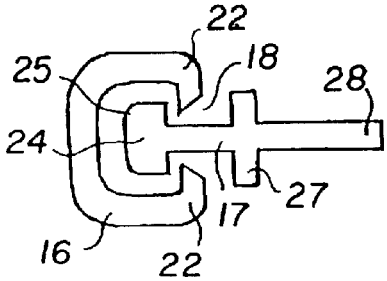
FIG. 6b

MEANS FOR MOVEABLE BILLS OR BRIMS OF CAPS AND HATS

Matter enclosed in heavy brackets [ ] appears in the original patent but forms no part of this reissue specification; matter printed in italics indicates the additions made by reissue.

This Appln claims the benefit of U.S. Provisional No. 60/137,551 filed Jun. 4, 1999.

BACKGROUND OF THE INVENTION

The present invention relates generally to hats and caps used as headwear, and more specifically to hats and caps having one or more bills or brims that also may be moved or rotated to various positions around the circumference of the crown of the headwear without detaching the bill or brim from the headwear.

This invention is an improvement over that described in my U.S. Pat. No. 5,715,534 issued Feb. 10, 1998 (Mobley), which describes headwear having a detachable bill or even a full brim that can be repositioned relative to the crown of the headwear while wearing the headwear and without detaching the brim or bill from the crown. It also describes unitary headwear that can give the appearance of being at least two separate hats and in which two or more bills or brims can be repositioned relative to balance of the headwear, such that neither the headwear nor the bills or brims need be removed from the headwear to be repositioned. As described in that patent, the ability to position easily one or more bills or fuller brims on a hat allows the wearer to adjust them to optimize their shading effect and protection from elements of weather such as rain or hail. Mobley also describes these uses of hats for self-expression, shading, and protection by freeing the wearer from the necessity of removing the hat or of detaching the bill or brim of the hat whenever the wearer wants to change its position. Again in Mobley, the means of attachment and detachment of the bills and brims to the headwear facilitates the creation of a unitary hat design that, when in place on the wearer's head, can give the appearance that two or more hats being worn.

Given that the bill or brim is capable of installation, removal and smooth repositioning as in Mobley, the present invention achieves the goal of improving the comfort, flexibility, durability and ease of change of the bill or brim portion of a cap or hat, by separating the bill or brim from the rest of the cap or hat with a unique arrangement for attachment of the bill or brim. This arrangement relieves mechanical strain, permits greater airflow, facilitates changes of one bill or brim for another, simplifies manufacture, and allows more flexible movement of the cap or hat in relation to the supporting structure for the bill or brim.

SUMMARY OF THE INVENTION

According to the present invention, there can now be provided comfortable, durable, and easily-fabricated headwear having an easily-detachable bill or even a fill brim that, as in Mobley, can be repositioned relative to the crown of the headwear while wearing the headwear and without detaching the brim or bill from the crown. In addition, my invention preserves all of the features and advantages of Mobley as summarized and described in the aforementioned Mobley patent.

A preferred embodiment of the present invention comprises a hat or cap including a crown, at least one T-channel and at least one U-channel, one of which channels is attached to the crown by the unique arrangement and circumscribes at least a substantial portion of the periphery of the crown, a brim or bill which is attached to the other of the channels, the U-channel and the T-channel engaging each other such that the T-channel slides along the interior surface of the U-channel. If preferably one or more removable and/or replaceable bills or brims are desired, the channels can be constructed to permit ready attachment and detachment but are securely in place when attached to the crown.

It therefore is an object of the present invention to improve the means by which the bills or brims can be repositioned relative to the body of the headwear without detaching the bills or brim from the headwear or removing the headwear from the wearer's head.

It is yet another object of the present invention, as in Mobley, to hide or mask from view the means by which the brims or bills may be repositioned in order not to detract from the appearance of the headwear.

It is a further object of the invention to simplify the manufacture of the repositioning apparatus, and facilitate its assembly with the hat.

It is another object of the present invention, as in Mobley, to provide headwear having an attachment means so that the bills or brims of the headwear are easily detachable and reattachable, enabling the headwear to be worn with any of a number of bills or brims, or with no bill or brim at all.

It is another object of the invention to increase the wearer's comfort through provision of improved ventilation between the sweatband and the crown of the hat.

BRIEF DESCRIPTION OF THE DRAWINGS

These and other objects and advantages of the invention will become clearer from the following detailed description of the preferred embodiments and the accompanying drawings in which like numbers represent like elements and wherein:

FIG. 4 is an exploded view of the embodiment of FIG. 1;

FIGS. 5, 6, 6a and 6b are perspective and end detail views of the sliding mechanism of my invention, FIGS. 6, 6a and 6b showing alternative forms for the invention's sliding mechanism and alternative forms for the extensions for attachment of a bill or brim;

DESCRIPTION OF THE PREFERRED EMBODIMENT

Figure 1:
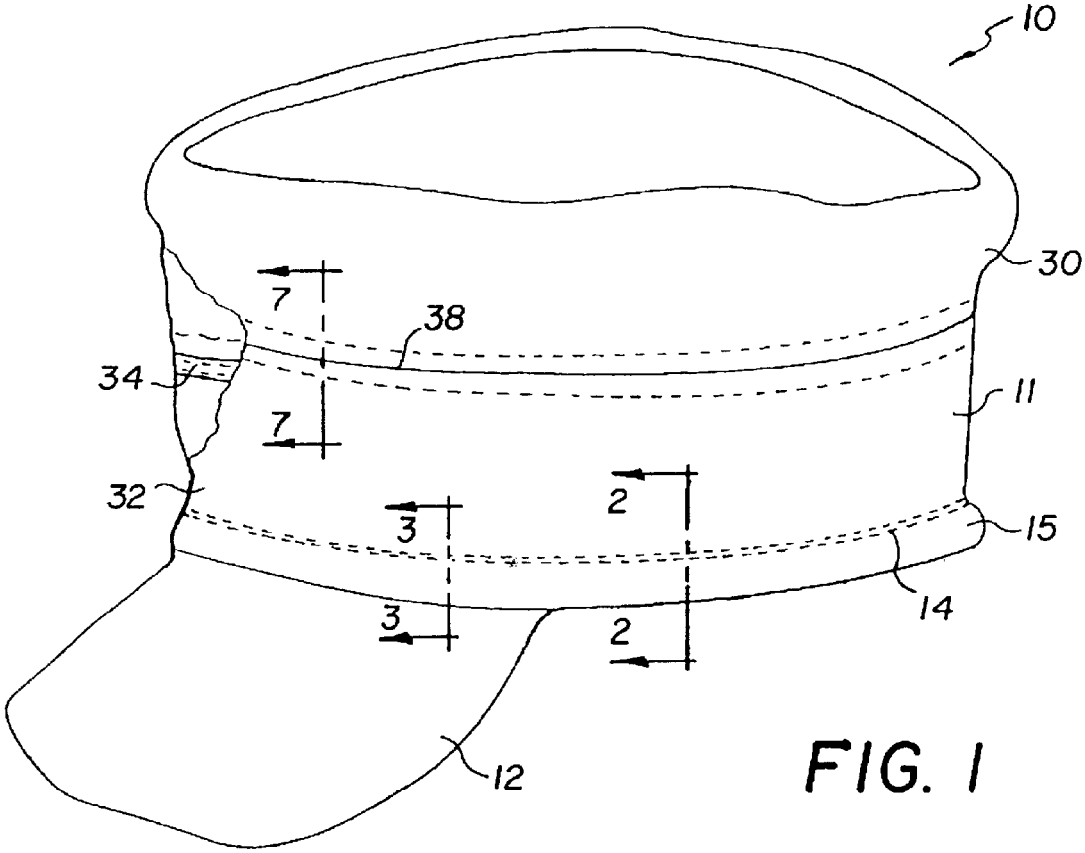
FIG. 1 is a perspective view of a preferred embodiment of the invention.
Figure 2:
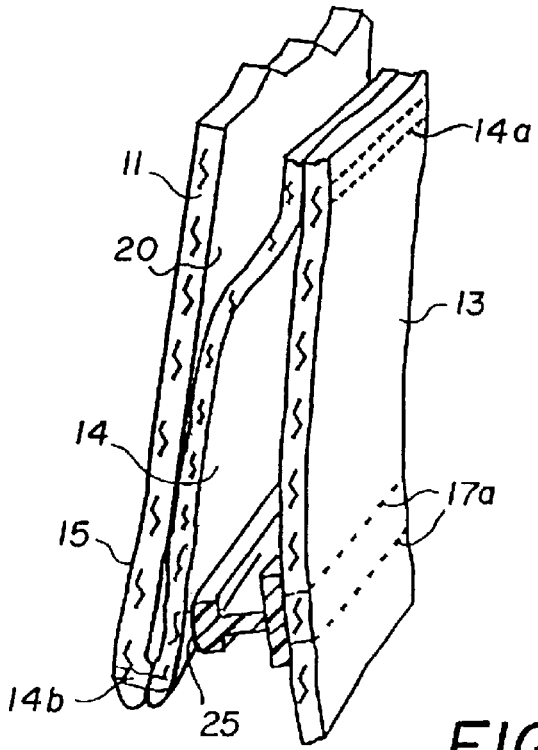
FIG. 2 is a partial sectional view of the first embodiment of the invention taken along line 2—2 in FIG. 1.

With reference to the preferred embodiment of the invention as shown in FIG. 1, hat 10 includes a crown 11 made of fabric and a bill or brim 12, although it should be noted that the invention is not limited to a particular crown or bill shape or material and in fact works with any number of crown and bill shapes, conventional materials and relative rigidity, including very flexible or "floppy" crowns and brims. Referring to FIG. 2, inside the crown 11 is a headband 13 that circumscribes at least a substantial portion and preferably the entire interior circumference of the crown 11. Headband 13 may take the form of any conventional headband material such as leather or fabric or may be a full or partial interior lining for the crown 11. Headband 13 is attached to a linking band *or intermediate web* 14 along its circumference at least at seam line 14a by stitching, permanent adhesive or the like, as is well known in the art. Linking band is preferably an elastic fabric band of about one inch width, such as that normally used for elastic waistbands of skirts and slacks, but may take the form of any material which supplies sufficient stiffness to support headband 13 and its attached sliding mechanism and sliding load; supplies sufficient flexibility and elasticity to conform comfortably to the wearer's head and allow easy wearer access to the sliding mechanism for purposes of changing and adjusting the sliding load; and supplies sufficient porosity to provide wearer comfort by permitting passage of air and ambient moisture. Linking band *or intermediate web* 14 is attached to the crown 11 along its circumference at its lower edge, at seam line 14b by stitching, permanent adhesive or the like, as is well known in the art, that is spaced from the upper seam line 14a so that an accessible space is created between the crown 11 and the headband 13 and by which the lower edge of crown 11 and band 14 together form a loose flap 15 under which is positioned the sliding mechanism according to my invention. The lower edge of crown 11 preferably is hemmed under band 14 as shown to improve appearance and to eliminate unraveling of the fabric.

Figure 3:
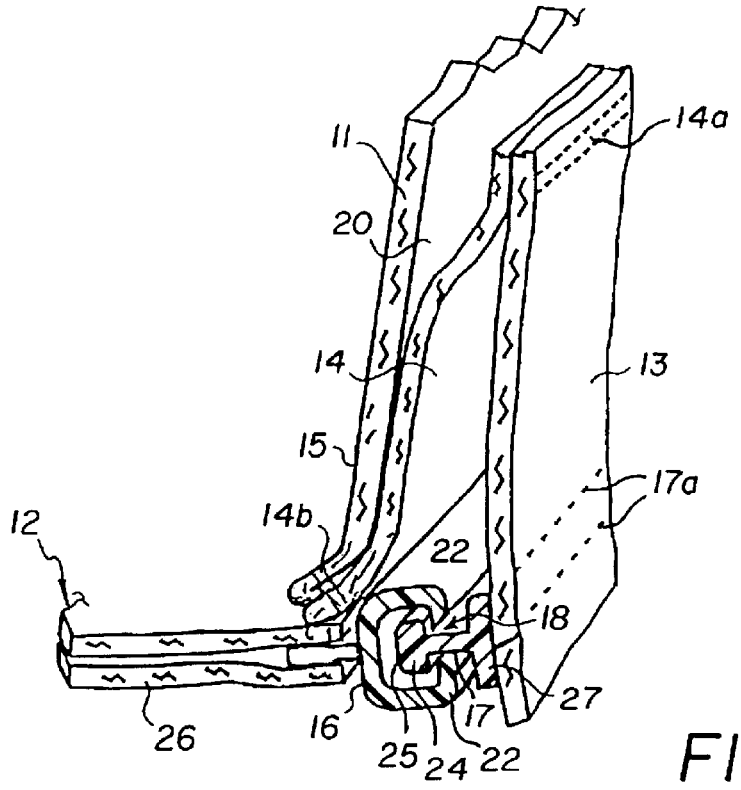
FIGS. 3 and 3a are partial sectional views of the first embodiment of the invention taken along line 3—3 in FIG. 1, each of the two figures showing a different form of attachment of the bill.

As shown in FIGS. 2 and 3, the bill 12 is attached to crown 11 by a sliding track mechanism having female and male interlocking parts which are a U-channel 16 and T-channel 17, respectively. Both channels are preferably made of a flexible semi-rigid material such an extruded polyvinyl chloride, or PVC, as will be described. T-channel 17 is sewn by double stitching 17a or adhesively fixed by its base 27 to the headband 13 either by stitching base 27 to headband 13 with opposing seams 17a or by any well known adhesive that will permanently bond PVC to a fabric within the space formed between the flap 15 of crown 11 and the headband 13, such that the T-channel 17 circumscribes at least a substantial portion or, preferably as shown by FIG. 4, the entire circumference of the outward-facing surface of the headband 13 and with its chamfered face 25 facing outwardly toward the inward-facing surface 20 of the crown 11. If crown 11 has a continuous headband 13 as in FIG. 4, the two extreme ends of T-channel 17 may then be stapled or otherwise affixed to each other at 17c to provide a continuous track around which bill 12 may ride. The open side 18 of U-channel 16 includes a pair of inwardly extending spring-like lips 22 preferably of thinner cross section which retain the cross portion 24 of T-channel 17 and enable the U-channel 16 to slide along at least a portion of the length of the T-channel 17.

If the cap 10 is of a known adjustable type having plastic or leather adjustable straps (not shown) at the rear of crown 12, the terminal ends of headband 13 then are sewn vertically to the ends of crown 12 adjacent to the straps, and T-channel 17 preferably cut just short of the sewn ends, say about ½ inch, alternately to enable U-channel 16 to be attached at those end points.

Figure 3A:
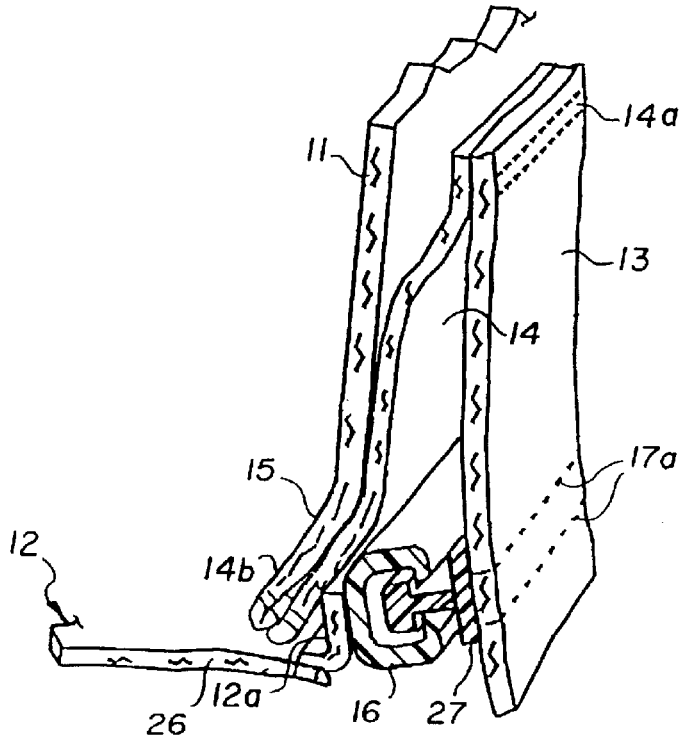

For a firm construction, the inner edge portion 26 of the bill 12 preferably is permanently affixed to and covering the leg portion 29 of U-channel 16 from both sides by an adhesive or stitching, either directly (FIG. 3) or preferably by an intermediate web material or binding 12a of matching colors (FIG. 3a).

Referring to FIGS. 5, 6, 6a and 6b, the spaces and dimensions have been exaggerated for clarity. U-channel 16 and T-channel 17, although both made of a flexible, semi-rigid PVC so as to be extrudable in longer lengths and bendable into various circular shapes, preferably are of differing densities, with the U-channel 16 of a lower density so that the lips 22 can be resiliently bent inwardly and outwardly as the T-section 24 of the T-channel 17 is inserted and removed, but spring back into retaining position after attachment and detachment of the bill or brim 12. The inner side 25 of T-section 24 is chamfered to facilitate insertion of T-channel 17 into U-channel 16. T-channel 17 preferably includes a collar 27 to ensure smooth gliding against lips 22. As is now evident from FIGS. 1 and 5, when the bill or brim 12 is attached to the crown 11 by insertion of the T-section 24 of the T-channel 17 into the U-channel 16 and slidingly held by the lips 22 of the U-channel 16, the bill or brim 12 may easily be rotated around the circumference of the crown 11 to any desired position and without removing the hat 10 from the wearer. When so attached, the bill 12 may be moved around the circumference of the crown 11 by the sliding of the T-channel 17 within and along the U-channel 16. When the headwear is properly assembled, the lower flap 15 of the crown 11 covers the T-channel 17 and the U-channel 16 so that they do not detract from the appearance of the headwear 10.

Referring to FIG. 3, because the track mechanism 16, 17 is sandwiched between the lining or headband 13 and the fabric or crown 11, there is because of elastic band 14 a smooth continuous gliding motion, and the mechanism never touches the head of the wearer.

Although in the preferred embodiment U-channel 16 is affixed to bill 12 and T-channel 17 is affixed to crown 11, it also is possible for the T-channel 17 to be affixed to the bill 12 and the U-channel 16 to be affixed to the crown 11.

*As can thus be seen, the invention of the embodiment of FIGS. 1–6, provides for a slide means having a subassembly including headband 13 with upper and lower sides and the intermediate web or linking band 14 attached both to crown 11 and to headband 13 on one of the headband sides. Both headband 13 and intermediate web 14 extend at least substantially around the circumference of the crown 11, with the subassembly further including either the U-channel 16 or the T-channel 17. A second subassembly of the slide means includes the other of the U-channel 16 or the T-channel 17 attached to the brim or bill 12. As shown, the channels 16, 17 are in interlocking slidable engagement with each other, and both channels 16, 17 are positioned between headband 13 and intermediate web or linking band 14 so as not to touch the wearer's head when the cap or hat is worn.*

Figure 8:
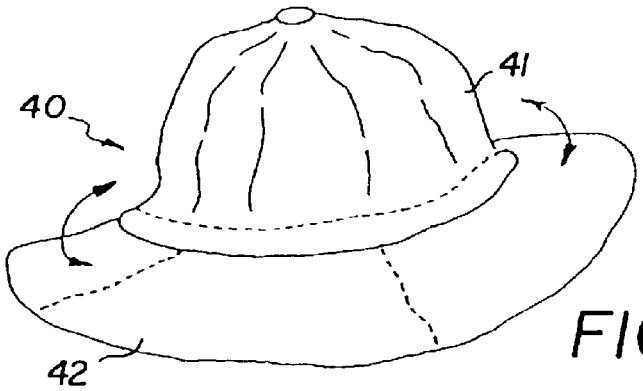
FIG. 8 is a perspective view of a second embodiment of the invention showing a full brim.
Figure 9:
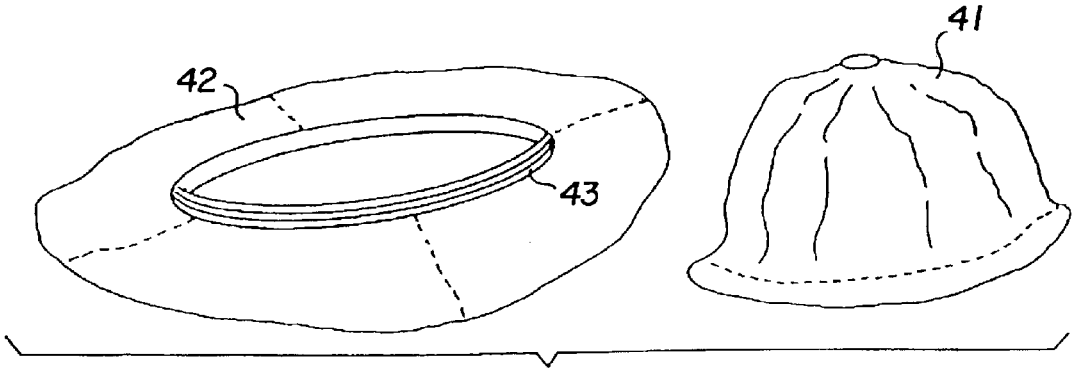
FIG. 9 is a perspective view of the second embodiment with the brim removed.

An alternative preferred embodiment of the invention is shown in FIGS. 8 and 9 to illustrate generally that my invention also works well with a full brimmed hat 40 in which the crown 41 can be worn with or without the brim 42. Brim 42 is attached to a T-channel in the same manner as brim 12 of the first embodiment, except that the U-channel 43 extends the full circumference of the hat along with brim 42. Brim 42 can be differently designed along its periphery so as to present different fashion statements as it is rotated, or different colored sections to indicate a particular position in a game. Alternatively, brim 42 may comprise differing structural components along its periphery, as for example a solid portion to act as an eye shade and a tinted translucent plastic to permit filtered light to pass through, or a full face-length screen mesh over a substantial part of the circumference of the brim 42 to selectively cover the face from insects and the like. Otherwise, the structural portions of this second embodiment are formed in the same manner as in the first embodiment.

Although not shown in the drawings, a headband on the interior of crown 41 may take the form of a conventional headband or may be a full or partial lining for crown 41. As with the first embodiment, the headband is attached via a linking band to the crown 41 so that an accessible space is created between crown 41 and the headband to receive the sliding mechanism.

Figure 10:
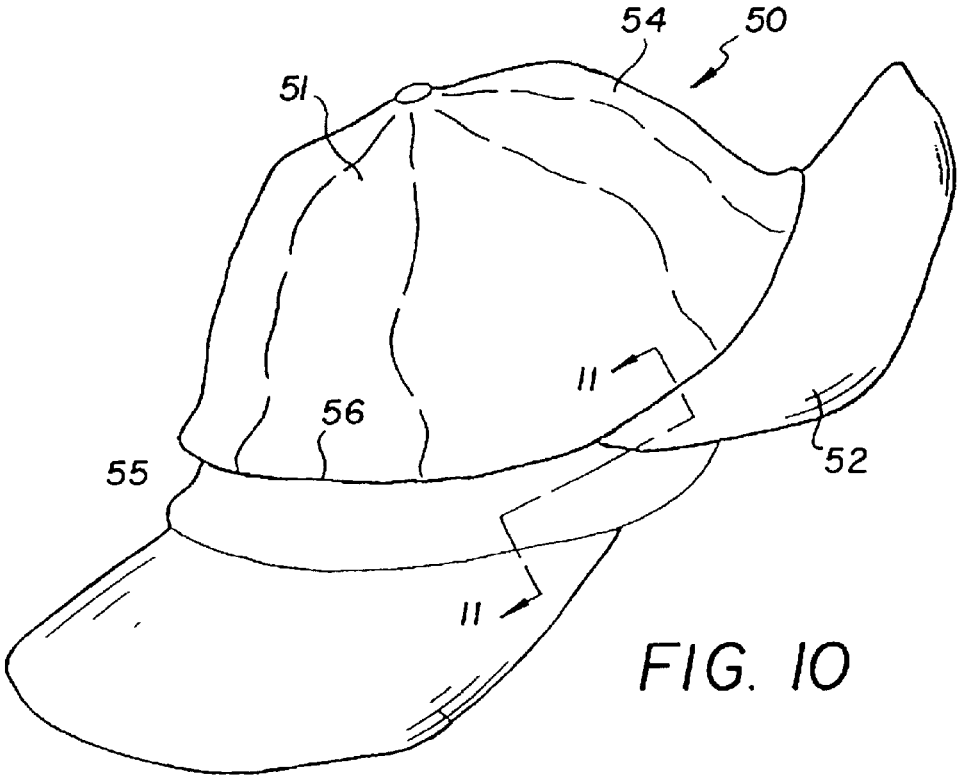
FIG. 10 is a perspective view of a third embodiment of the invention simulating two hats.
Figure 11:
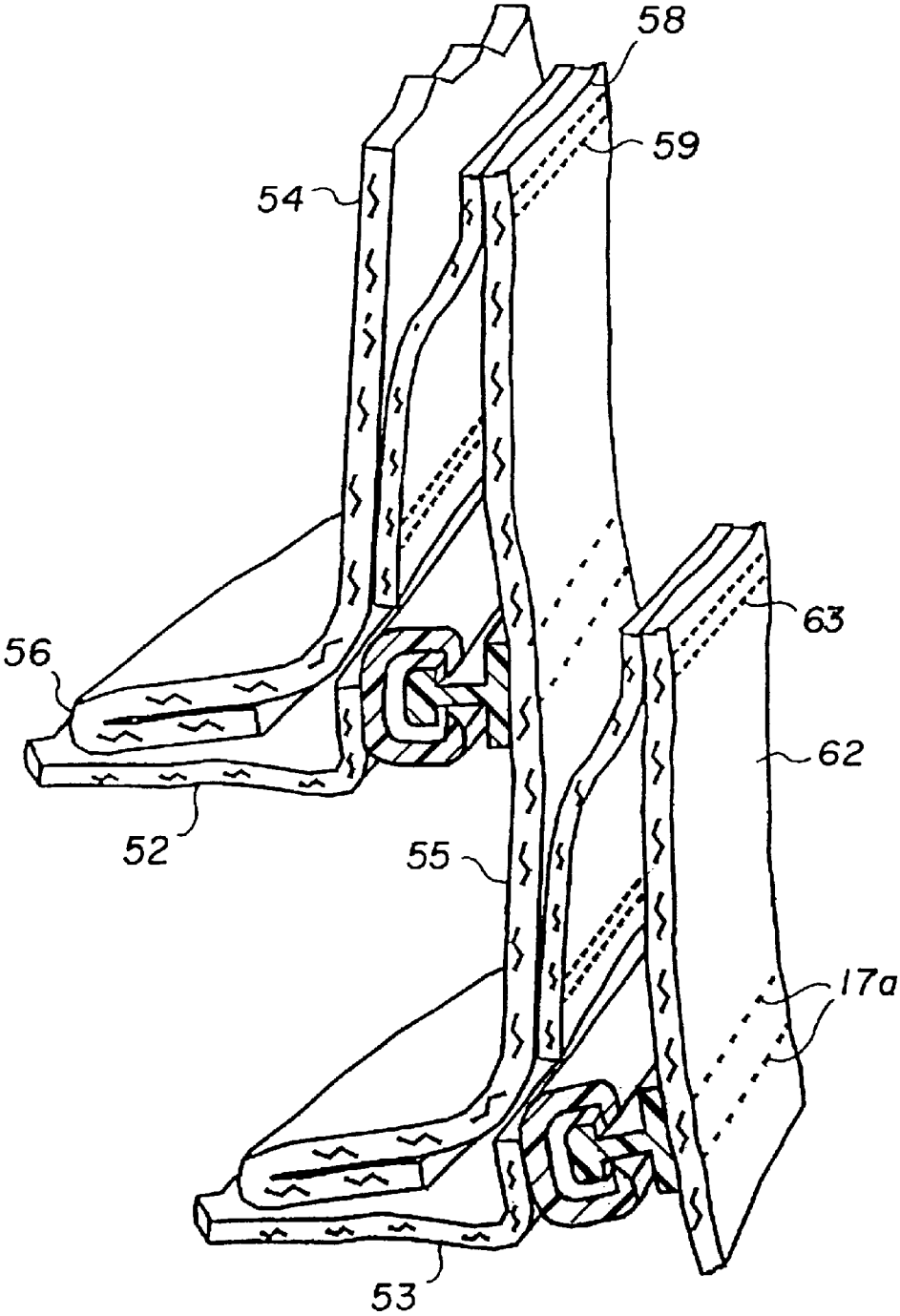
FIG. 11 is a partial sectional view of the third embodiment of the invention taken along line 11—11 in FIG. 10.

A third and further embodiment of my invention is shown in FIGS. 10 and 11. As shown in FIG. 10, headwear 50 comprises crown 51 and two bills 52 and 53. Crown 51 comprises upper crown 54 and lower crown 55. Upper crown 54 is formed in the same manner as the complete crown portion of a regular hat having a hemmed lower edge 56. The lower crown 55 approximates a truncated cone, in which the outside diameter of its upper edge 58 equals the inside diameter of the lower edge 56 to which it is attached via linking band 59 along their respective circumferences. As shown in FIG. 11, a headband or lining 62, in which the T-channel 17 is adhesively fixed or sewn at 17a, is sewn at seam 63 inside linking band 14 in the same manner as in the first embodiment. Linking band 14 is attached to the lower crown 55 along its circumference at least at seam line 14b. The upper edge 58 of lower crown 55 in turn is sewn at seam 59 inside linking band 59. As in the first embodiment, linking band 59 is attached to the upper crown 54 along its circumference at least at seam line 59a, and together with lower crown 55 acts as the liner for the upper crown 54. Below linking band 59, a second T-channel 17 is sewn at 17a or adhesively fixed to the outside of lower crown 55. Each of the T-channels 17 receive the corresponding removable U-channels 16 of the two bills 53 and 52, respectively. The two crown portions 54, 55 and their respective bills 52, 53 can be of the same or different designs and can provide a substantial opportunity for creativity. The crown shapes, however, will be governed by the hat styles, as can the lengths of the lower sections, of the upper and lower crowns, extending below seams 14b. Although in a preferred embodiment the upper crown 54 and the lower crown 55 together form a dome-shaped crown, it is understood that the crown can take any firm or floppy shape. For fashion millinery, headband 62 preferably is a full or partial lining of the crown at least to cover the inside seams connecting the upper and lower crown portions 54, 55. Similarly, the bills 52, 53 can be rotated along and/or removed from their respective crowns 54, 55 to present very different appearances of the headwear.

The manufacture and assembly of a cap or hat according to this invention is now substantially simplified, in that quantities of bills 12 and crowns 11 can be manufactured in their traditional manner, while the sliding mechanisms separately manufactured and supplied in long lengths cut to size as needed. To accomplish this, the crown portion of the sliding mechanisms is assembled by sewing lengths of headband 13 material at one side (seam 14a) to [lining band] *linking band or intermediate web* 14, and lengths of T-channel 17 sewn to the headband 13 material at its other side (seams 17a). Similarly, lengths of U-channel 16 are sewn to an intermediate [web material or] or binding 12a [at seam 12b]. For final assembly, the crown portion of the sliding mechanism is then cut to length to fit crown 11 and linking band 14 sewn to crown 11 at seam 14b, while the bill portion of the mechanism is also cut to length and the intermediate [web material] *binding* 12a sewn to bill 12 as shown. If the cap is of the adjustable type, the ends of headband 13 are also vertically sewn to crown 11 at its lower periphery.

Although the invention is described by reference to specific preferred embodiments, it is clear that variants can be made and other materials used without departing from the spirit of the invention as described and claimed.

I claim:

1. Headwear comprising a crown having a substantially circumferential body to fit on a wearer's head, at least one bill or brim extending substantially laterally away from the crown body and the wearer's head, and at least one slide means for connection of the bill or brim to the crown and for rotation of the bill or brim relative to the crown, the improvement in which the slide means comprises a first slide subassembly attached to the periphery of the crown body and extending at least a substantial portion around the circumference of the crown body, and a second subassembly attached to the bill or brim adjacent the crown body, the first and second subassemblies each having a channel member with means for interlocking and slidable engagement of the channel members relative to each other, the first subassembly comprising a headband having upper and lower sides with its channel member attached to the lower side, and an intermediate web having upper and lower sides with the upper sides of both the headband and the intermediate web attached to each other and the lower side of the intermediate web attached to the periphery of the crown body.

2. Headwear according to claim 1 wherein the intermediate web comprises an elastic fabric.

3. Headwear according to claim 1 wherein one of the channels members comprises a T-channel and another of the channels members comprises a U-channel, one of which channels is attached to the headband and is positioned between the crown body and the intermediate web, and the other channel is attached to the brim or bill and is detachably engaged with the one channel to enable both sliding engagement with and detachment from the one channel.

4. Headwear according to claim 3 wherein both channels are made of a flexible semi-rigid material such as extruded polyvinyl chloride, and the T-channel circumscribes substantially the entire circumference of the headband.

5. Headwear according to claim 3 wherein the T-channel forms a continuous track and the U-channel comprises a pair of inwardly extending spring-like lips which releasably retain a portion of the T-channel.

6. Headwear according to claim 1 wherein the channel members are positioned between the headband and the intermediate web such that channel members do not touch the wearer's head.

7. Headwear according to claim 1 wherein the intermediate web is a ventilated material to enable ventilation between the headband and the crown body.

8. Headwear according to claim 1 wherein the intermediate web comprises a linking band of elastic fabric with sufficient stiffness to support the headband and the first subassembly channel member and with sufficient flexibility and elasticity to conform to the wearer's head with access to the sliding mechanism for purposes of changing and adjusting the bill or brim, and with sufficient porosity to permit passage of air and ambient moisture.

9. Headwear according to claim 1 wherein intermediate web as attached to the crown body and headband defines a covered space between the crown body and the headband and by which the lower edge of crown body and intermediate web together form a circumferential flap under which is positioned the slide means for hiding the slide means from view.

10. Headwear according to claim 1 wherein the crown body is comprised of at least two sections, and further comprising at least one other slide means for detachably connecting the two sections for enabling the sections to rotate relative to each other and to be detached from each other.

11. Headwear according to claim 1 and further comprising at least one other slide means and at least a second bill or brim detachably and slidably engaged to the crown body by the other slide means.

*12. Headwear comprising a crown having a substantially circumferential body to fit on a wearer's head, at least one bill or brim extending substantially laterally away from the crown body and the wearer's head, and at least one slide means for connection of the bill or brim to the crown and for rotation of the bill or brim relative to the crown, the improvement in which the slide means comprises a first subassembly attached to the periphery of the crown body and extending at least a substantial portion around the circumference of the crown body, and a second subassembly attached to the bill or brim adjacent the crown body, the first and second subassemblies each having a channel member with means for interlocking and slidable engagement of the channel members relative to each other, the first subassembly comprising a headband having upper and lower sides and an intermediate web having upper and lower sides with the upper sides of both the headband and the intermediate web attached to each other and the lower side of the intermediate web attached to the periphery of the crown body, the channel member of the first subassembly positioned between the headband and the intermediate web such that the channel members do not touch the wearer's head.*

* * * * *